United States Patent
Wojnarowski

(10) Patent No.: US 6,883,926 B2
(45) Date of Patent: Apr. 26, 2005

(54) LIGHT EMITTING SEMI-CONDUCTOR DEVICE APPARATUS FOR DISPLAY ILLUMINATION

(75) Inventor: Robert J. Wojnarowski, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 39 days.

(21) Appl. No.: 10/207,317

(22) Filed: Jul. 29, 2002

(65) Prior Publication Data

US 2002/0186556 A1 Dec. 12, 2002

Related U.S. Application Data

(63) Continuation of application No. 09/625,127, filed on Jul. 25, 2000, now abandoned.

(51) Int. Cl.[7] .................................................. F21V 9/16
(52) U.S. Cl. ........................ 362/84; 362/23; 250/461.1
(58) Field of Search .............................. 362/84, 23, 28, 362/29, 812, 800, 489; 250/461.1, 463.1

(56) References Cited

U.S. PATENT DOCUMENTS

| | | | |
|---|---|---|---|
| 4,044,708 A | * | 8/1977 | Klein ........................ 116/328 |
| 4,536,656 A | | 8/1985 | Sowa |
| 4,882,659 A | | 11/1989 | Gloudemans |
| 4,999,936 A | | 3/1991 | Calamia et al. |
| 5,130,597 A | * | 7/1992 | Mariani ................... 310/313 D |
| 5,351,255 A | | 9/1994 | Schetzina |
| 5,372,087 A | | 12/1994 | Kato et al. |
| 5,416,674 A | | 5/1995 | Murai |
| 5,477,430 A | | 12/1995 | LaRose |
| 5,607,222 A | | 3/1997 | Woog |
| 5,614,961 A | | 3/1997 | Gibeau et al. |
| 5,678,917 A | | 10/1997 | Bergkvist |
| 5,700,076 A | | 12/1997 | Minich et al. |
| 5,793,911 A | | 8/1998 | Foley |
| 5,833,349 A | | 11/1998 | Apple |
| 5,997,161 A | * | 12/1999 | Stringfellow et al. ........ 362/489 |
| 5,998,925 A | | 12/1999 | Shimizu et al. |
| 6,139,174 A | | 10/2000 | Butterworth |
| 6,299,338 B1 | * | 10/2001 | Levinson et al. ............ 362/559 |
| 6,357,889 B1 | * | 3/2002 | Duggal et al. ................ 362/84 |
| 6,364,498 B1 | * | 4/2002 | Burbank ...................... 362/84 |
| 6,454,437 B1 | * | 9/2002 | Kelly .......................... 362/246 |

* cited by examiner

Primary Examiner—John Anthony Ward
(74) Attorney, Agent, or Firm—Fay, Sharpe, Fagan, Minnich & McKee, LLP

(57) ABSTRACT

An apparatus for visual illumination comprised of a display surface, including a phosphor material. At least one light emitting semi-conductor device is (LED) positioned to radiate the phosphor material. The LED emits electromagnetic radiation in a range which excites the phosphor material.

18 Claims, 2 Drawing Sheets

LIGHT EMITTING SEMI-CONDUCTOR DEVICE APPARATUS FOR DISPLAY ILLUMINATION

This Application is a continuation of Ser. No. 09/625,127, filed Jul. 25, 2000, now abandoned.

BACKGROUND OF THE INVENTION

The present invention relates generally to light sources. More particularly, the present invention relates to light emitting semi-conductor light sources. The present invention has particular relevance to illumination of a display via a semiconductor device(s).

Conventional incandescent light bulbs have limited light efficiency. Conventional fluorescent light bulbs include mercury. Accordingly, there is a need for a light source that has long life and high efficiency and does not create environmental concerns.

One solution to this need is envisioned to be semiconductor based light emitting diodes and laser diodes, herein after both are generally referred to as LED(s) The LED has a small size, high efficiency, can emit bright color light, and as a semiconductor element, is not vulnerable to breakage. Also, it has excellent initial driving characteristics and vibration resistance. Furthermore, it can withstand repeated ON/OFF cycling. Consequently, LEDs have been widely used as various types of indicators and light sources.

Recently, light emitting diodes of red, green and blue colors with high luminance and high efficiency have been developed, and these light emitting diodes have been used in manufacturing large size LED displays. In order to use light emitting diodes to get white light, since LEDs have monochromatic peak wavelengths, three LEDs of red, green and blue have been used in combination to diffuse and blend their colors into white. Such LED displays can operate at low power, have lite weight, and long life.

In addition, recently, efforts have been made to create individual light emitting diodes which emit white light. More particularly, a device that uses a fluorophor to convert non-white light emitted from the LED to white light has been used. Similarly, the use of a phosphor to create green, red and other colors is possible and can have particularly desirable use in display applications. Accordingly, recent technology has provided a wide spectrum of LED generated light colors suited to display applications. For example, a vehicle dashboard with multiple color LED generated presentations can be envisioned.

The suitable LED is typically constructed of a semiconductor epistructure light emitting element set in a cup on the tip of a lead frame. The light from the light emitting element is either already in a suitable/visible color (e.g. red) or is absorbed by a phosphor contained in a resin molding that covers the light emitting element. The phosphor emits at a wavelength different from the absorbed light (wavelength conversion) In one exemplary device, the light emitting element emits blue light and the phosphor absorbs the emitted blue light and emits yellow light The combination of yellow phosphor light and blue light emitting element light makes it is possible to manufacture an LED that can emit white light.

Generally, however, LED light is directional and does not evenly illuminate areas without diffusers or other light averaging structures with considerable light loss. Moreover, traditional LED structures produce illumination having an intensity pattern, as each LED device shines on a small area and may produce a halo effect via a high intensity spot at the center. This is not visually desirable nor aesthetically pleasing to the eye. Furthermore, these undesirable light patterns can light unnecessary areas and detract from the eye's ability to focus rapidly on a display. More particularly, since it is desirable to illuminate only certain numbers, messages, dials, etc. general lighting of the are is unacceptable. Similarly, general lighting on a surface can be problematic since the display targets (e.g. number, words, dials) may have surfaces with varied pitch which general lighting cannot readily illuminate.

This type of light distribution can be particularly troublesome when used to illuminate display surfaces, such as dashboards or control devices such as turning indicators. Moreover, areas of high and low light intensity are undesirable.

Furthermore, the addition of phosphors to an LED device results in a relatively costly manufacturing process that yields an apparatus which may lack consistency, maintainable color temperature and lumen integrity. Accordingly, current LED use in association with display surfaces could be improved.

BRIEF SUMMARY OF THE INVENTION

According to one embodiment of the present invention, an apparatus for illumination of a display surface is provided. The apparatus is comprised of a display surface including a patterned phosphor or phosphor containing material and at least one light emitting semi-conductor device or laser diode (LED). The employed phosphor may be of various compositions generating light of single or different colors. The LED is positioned to cast its generated electromagnetic radiation onto the display surface. The phosphor included in the display surface is activated in the range of electromagnetic radiation emitted by the LED to produce single or multi-colored characters or shapes on the display surface as desired. Moreover, activation of the LED provides electromagnetic radiation which excites the phosphor to create a visible image.

In certain exemplary embodiments of the invention, the image will be comprised of letters or numbers or will be comprised of a shaped pattern which provides general illumination of another element such as a gauge, dial, clock, etc. Accordingly, the present invention can be used to illuminate display readouts, such as a speedometer, by exposing areas of phosphor in desired areas of the display read out to light from the LED and causing the phosphor to excite in the visible region and to illuminate the display. The present invention advantageously allows the phosphor treated areas to illuminate while the remainder of the display surface remains dark.

Advantageously, the device avoids the use of multiple visible light generating LEDs, which may otherwise require separate phosphor and lensing systems.

Furthermore, the present device can be used advantageously in front or rear illumination apparatus.

In an alternative embodiment, the utilization of various combinations of LEDs and phosphor materials allows dimmable displays to be created. Similarly, various combinations of phosphor materials and/or LEDs can be used to create multiple color displays.

Each of these embodiments can be achieved by a pattern of phosphor material dispersed within the visual display, coated on the surface of the visual display element, or disposed on or in a film laminated on the surface of the visual display element. In fact, other mechanisms for positioning the phosphor but not detailed herein are nonetheless envisioned as suitable for the present invention.

Exemplary, but non-limiting display application suited to the present invention include dashboards, clocks, watches, signs, indicators, etc..

BRIEF DESCRIPTION OF THE DRAWINGS

The features of the invention are set forth with particularity in the appended claims. The invention itself, however, may well be understood by reference to the following description in conjunction with the accompanied drawings:

DETAILED DESCRIPTION OF THE INVENTION

Figure 1:
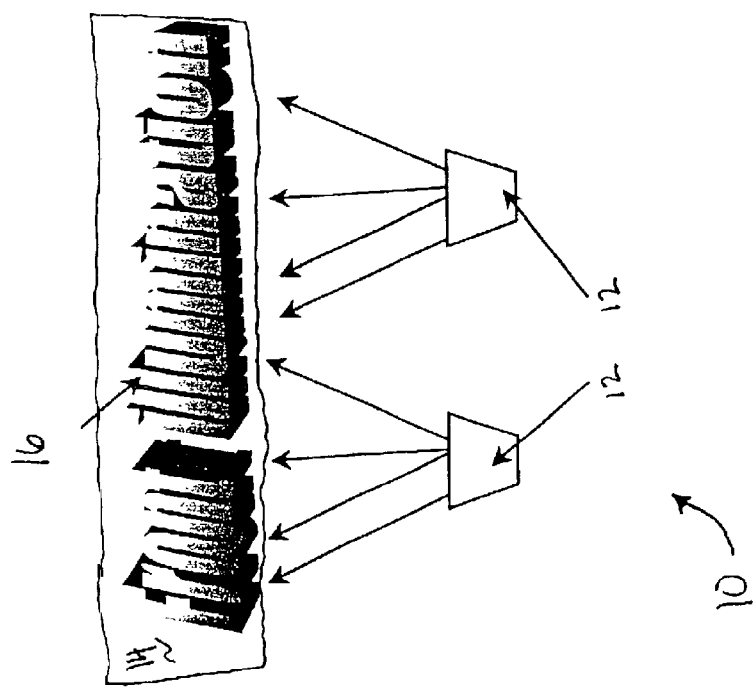
FIG. 1 is a schematic representation of the present invention.

Referring now to FIG. 1, a front illumination display device 10 is depicted comprised of LEDs 12, and display surface 14 containing patterned phosphor material 16. The display surface 14 can be comprised of any material typically utilized in the construction of a display such as wood, metal, polycarbonate or other polymeric material. The phosphor can be molded therein, surface coated, or disposed in a film which is laminated on the substrate surface.

In these embodiments, ultraviolet, or blue light emitting semi-conductor devices (LED) such as those generated from silicon carbide or gallium nitride can be used. Of course, large diodes would also be highly suited to each of these embodiments. The phosphor may be patterned or the panel may have the equivalent of an etched or punched mask with desired characters etched or stamped in. The phosphor may be disposed in a film in this case which bridges the etched character openings.

Figure 2:
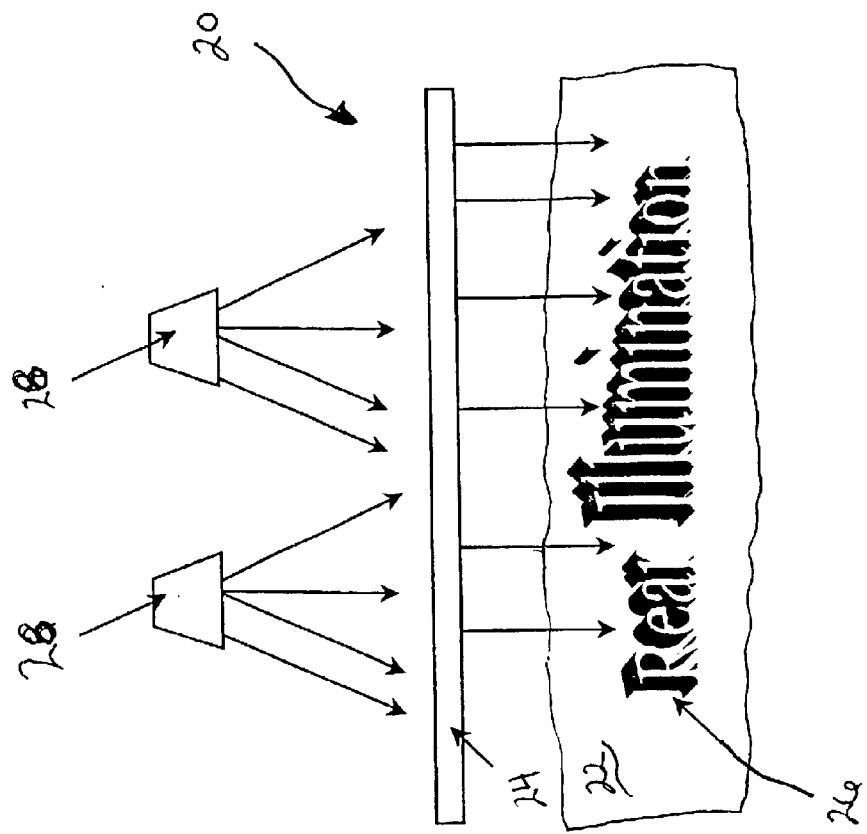
FIG. 2 is a schematic representation of an alternative rear illumination embodiment of the present invention.

Conventional LEDs can be used as well as new types of light emitting devices as such new types of LEDs are developed. However, the present invention is best suited, although not limited to, an unpackaged LED. The term "unpackaged" is meant to describe LEDs that are derived from the wafer state and may have some electrical connections patterned thereon. However, the unpackaged LEDs do not include an epoxy packaged phosphor containing layer adjacent the semiconductor itself While any LED can be employed, i.e, red, yellow, green, etc., UV and blue are preferred, For purposes of this invention a gallium nitride LED of the type described in U.S. Pat. No. 5,998,925 in combination with a phosphor (such as YAG) are suitable examples. Of course, any phosphor excited by any suitable wavelength and emitting any wavelength of light (e.g. red, yellow, green) may have application in this invention. Moreover, the selection of phosphor is limited only by the wavelength of radiation generated by the LED and the desired ultimate viewable light. In this context, the ultimate visible light could be unobservable to the unaided eye but visible via a further device. For example, infrared light could be generated by the excited phosphor and made visible via suitable view piece to provide observability only to the view piece wearer. This is particularly suited to covert applications Referring now to FIG. 2, a rear illumination embodiment is depicted. Moreover, in this embodiment, display device 20 includes the display surface 22 as the closest element of the apparatus to the viewer. Behind display surface 22 is at least substantially 100% transmitting diffuser 24 of any type known to those skilled in the art to provide a coherent pattern upon the patterned phosphor material 26 illuminated surface of the display. Rearward of the diffuser 24 are LEDs 28. In this embodiment, LEDs 28 emit light in the blue or UV range. Referring again to display surface 22, it is preferably comprised of a material substantially transparent to the range of radiation generated by the LEDs and/or the phosphor creating the image. In this context, the patterned phosphor material can be disposed on the surface of the display closest to the LEDs, embedded in the display material, or disposed on the surface of the display distant from the LEDs. In any event, the translucence of the display material facilitates the transmittance of the electromagnetic radiation as necessary to excite the phosphor material and/or transmit the light generated by the phosphor material as appropriate. In accord with any embodiment of the present invention, the phosphor can be deposited onto the display as a coating, disposed therein, in a film laminated thereon, or via any other technique suitable to the skilled practitioner. In any embodiment using UV LEDs, it may be desirable to place a visible light transmission UV filter between the display surface and the viewer to protect from UV radiation. Similarly, a filter can be used to shield the viewer from any wavelength generated by the LEDs.

Figure 3:
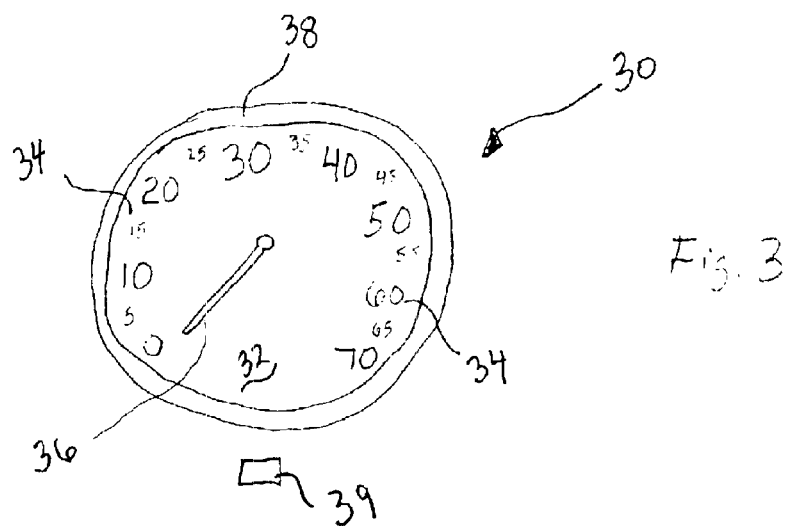
FIG. 3 is an alternative embodiment of the invention wherein divergent phosphor materials are utilized in conjunction with a single radiation generating LED.

Referring now to FIG. 3, a display device 30 is depicted wherein divergent phosphor materials are utilized in conjunction with a single wavelength radiation generating LED (s). More particularly, in this embodiment, a speedometer display 32 is provided including speed designation phosphor patterns on the surface 34. In this embodiment, the phosphor selected for the even numbered speeds will emit in a first color range (e.g. red) and the phosphor selected for the odd number speeds and needle 36 will emit in a second color range (e.g. yellow). This embodiment also exemplifies application of the inventive technique for general illumination of a display surface. Moreover, a phosphor ring 38 is provided surrounding display surface 32. The phosphor forming ring 38 can be used to provide general illumination of the display surface 32, an effect which could be enhanced via a reflecting element (not shown) surrounding ring 38. While the phosphors could be selected to be excitable at different radiation wavelengths (see FIG. 5) this embodiment uses phosphors exited at the same wavelength and therefore via the same LED(s) device 39.

Figure 4:
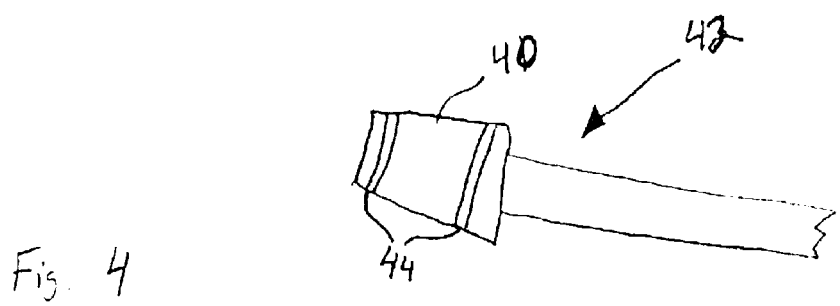
FIG. 4 is a further exemplary embodiment of the invention wherein a patterned non-numeric or character display is provided.

Referring now to FIG. 4, the use of the invention in a general illumination pattern is depicted. Moreover, an LED (not shown) is provided within nob 40 of turning indicated 41 to illuminate a phosphor pattern forming a pair of rings 44 to facilitate location of the nob by the operator of a vehicle. In this embodiment, the light generated via the excitation of the phosphor ring patterns draws attention thereto.

Figure 5:
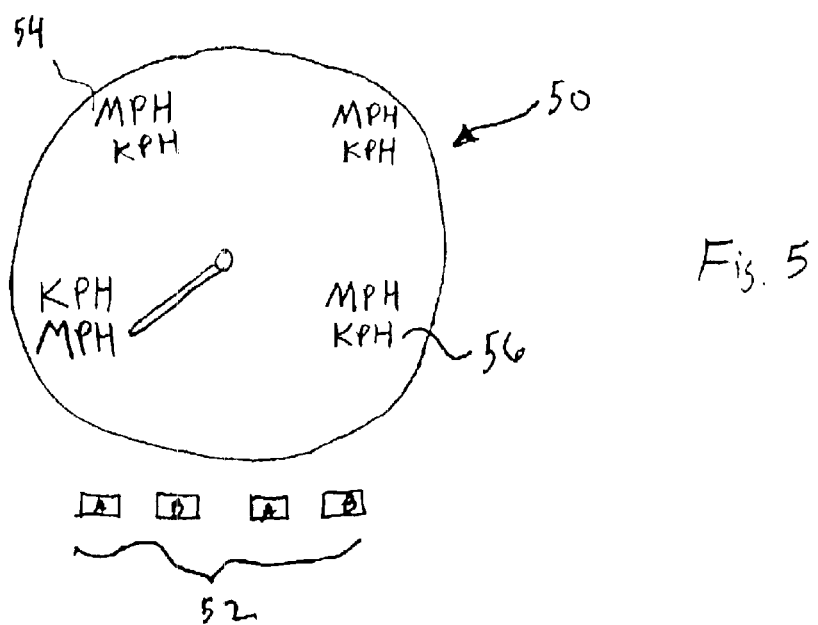
FIG. 5 is an alternative embodiment of the invention wherein an LED array is utilized as the illumination source of a patterned phosphor display.

Referring now to FIG. 5, a display device 50 is depicted which is illuminated via an LED array 52. In this embodiment, the LED array 52 can be used to selectively provide electromagnetic radiation at various wavelengths—in accord with the physical design of the semi-conductor devices or voltage applied thereto—to selectively illuminate different phosphor materials used for miles per hour (MPH) display 54 or kilometers per hour (KPH) display 56.

Accordingly, LEDs A could radiate and excite phosphor material 54 while LEDs B could radiate and excite material 56. Selectively powering the LEDs therefore selectively illuminates the display. Similarly, LED design or power can be used to provide dimmable capabilities. A suitable LED array for this embodiment is described in U.S. Ser. No. 09/258,935. In alternative embodiments of the present invention a flexible and/or curved substrate can be used. The term "flexible" is intended to encompass substrates that are capable of being bent under normal conditions or substrates that can have their shapes altered by processes such as heat forming. In some situations, bending is facilitated by bonding or conforming a substrate to a curved surface. The degree of flexibility will depend on the material properties and the thickness of the substrate (which can be reduced by techniques such as grinding, for example) and, to a limited extent, on the properties of LEDs. Flexible substrates are useful for providing light sources according to the present invention that are conformal to airplane cockpits and automobile dashboards, for example. Similarly, the phosphor containing display device can be flexible.

In certain embodiments a reradiative component can be used, particularly, one comprised of a plurality of lenses with each lens being situated over a respective one of the LEDs. Alternatively, the reradiative component comprises a reradiative panel which may optionally be tinted to create a change in color of light emitted from LEDs. Reflector components can be used with or without reradiative panels. Although the reflector components are typically parabolic, other optimized reflector component shapes can alternatively be used. As one example, using a stepped profile or a geometric profile can aid in forming a specific pattern of light.

A control system can be used for selecting the manner and timing of providing the electrical power to each respective one of the LEDs. A control system may be included within a control device, or a control system may be situated outside the substrate.

In a control system, AC (alternating current) line voltage (from a 120 volt or 140 volt power supply, for example) is rectified and filtered by rectifier and filter to provide DC voltage. A power conditioner can modulate the signal to supply power to LED array at different levels in accordance with a user input or automated selection This can provide flexibility if an operator wants the light source to be dimmed and/or a different display to be illuminated.

The power conditioners of the control systems can also aide in LED array cooling by creating a duty cycle for selectively providing power to predetermined LEDs for a set period of time and then switching the power to different ones of the LEDs. Duty cycles can be used both for controlling heat energy and for controlling the light output. For example, alternate row and column or alternate LEDs can be turned on and off per a schedule. If desired, the control system can be extended to accommodate power and/or control features such as shutters.

A control system, whether formed from active or passive electronics, can provide flexibility for the light source. For example, if old LEDs change color over time, the amount of power supplied to LEDs and/or the LEDs to which power is supplied can be varied to correct any undesired change in light or to allow the light source to be used in different forms.

The control system can also be used to affect tint control, light hue, and color shift by power modulation techniques. Additionally, phase modulation and phase array modulation in combination with a high persistence phosphor (not shown) can provide a lighting glow to remain during low cycles of the power curve.

The LEDs may be duty cycled or phased array to give a dimming effect for the display. Phosphors or light can be chosen to eliminate a non-visible spectra, for covert concealment purposes, such as airplane cockpit or concealed around different situations. In these situations, a heads up display apparatus can be provided to pick up the illumination of the phosphors.

While only certain preferred features of the invention have been illustrated and described herein, many modifications and changes will occur to those skilled in the art. It is, therefore, to be understood that the appended claims are intended to cover all such modifications and changes that fall within the true spirit of the invention.

What is claimed is:

1. An apparatus for illumination comprising a display surface including a patterned phosphor or phosphor containing material and shaped to illuminate a gauge or dial, and at least one light emitting semi-conductor device or laser diode positioned to excite said phosphor material, said light emitting semi-conductor device emitting electromagnetic radiation in a range which excites said phosphor material.

2. The apparatus of claim 1 wherein said patterned phosphor or phosphor containing material is in a shape of letters or numbers.

3. The apparatus of claim 1 wherein at least two phosphors having different radiation excitation states are included.

4. The apparatus of claim 1 wherein multiple light emitting semi-conductor devices or laser diodes are employed.

5. The apparatus of claim 4 wherein at least two of said multiple light emitting semi-conductor devices or laser diodes emit radiation at different wavelengths.

6. The apparatus of claim 1 wherein a diffuser is provided between said light emitting semi-conductor device or laser diode and said patterned phosphor or phosphor containing material.

7. The apparatus of claim 1 wherein said light emitting semi-conductor or laser diode emits electromagnetic radiation in the blue or UV range.

8. The apparatus of claim 1 wherein said patterned phosphor or phosphor containing material is dispersed within the display surface.

9. The apparatus of claim 1 wherein said patterned phosphor or phosphor containing material is coated on the surface of the display element.

10. The apparatus of claim 3 wherein said at least two phosphors having different radiation excitation states are used as separate patterns in said display surface.

11. The apparatus of claim 1 wherein at least two phosphors generating radiation at different wavelengths are included.

12. The apparatus of claim 11 wherein said at least two phosphors are excited at the same wavelength.

13. The apparatus of claim 1 wherein said display surface is generally planar.

14. The apparatus of claim 1 wherein said display surface is generally non-planar.

15. The apparatus of claim 1, further comprising a filter blocking transmission of at least a portion of the light by said light-emitting semi-conductor device, said filter positioned between said at least one light emitting semi-conductor and an inlead portion for viewing the display surface.

16. A vehicle dashboard comprising a display surface including a plurality of gauges or dials, a plurality of LED(s)

positioned to radiate electromagnetic radiation on said display surface, and said gauges or dials including at least one phosphor which is excited by the electromagnetic radiation of said LED(s) to produce light in a visible spectrum.

17. An apparatus for illumination comprising a display surface including a patterned phosphor disposed on or in a film, said film being laminated to the display surface, and at least one light emitting semi-conductor device or laser diode positioned to excite said phosphor material, said light emitting semi-conductor device emitting electromagnetic radiation in a range which excites said phosphor material.

18. An apparatus for illumination comprising a display surface including a patterned phosphor or phosphor containing material and at least one unpackaged light emitting semi-conductor device or laser diode positioned to excite said phosphor material, said light emitting semi-conductor device emitting electromagnetic radiation in a range which excites said phosphor material.

* * * * *